(12) United States Patent
Craig et al.

(10) Patent No.: US 11,204,802 B2
(45) Date of Patent: Dec. 21, 2021

(54) ADJUSTING A DISPATCH RATIO FOR MULTIPLE QUEUES

(71) Applicant: International Business Machines Corporation, Armonk, NY (US)

(72) Inventors: Matthew Richard Craig, Sahuarita, AZ (US); Matthew J. Kalos, Tucson, AZ (US); Matthew G. Borlick, Tucson, AZ (US); Micah Robison, Tucson, AZ (US); Lokesh Mohan Gupta, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 16/859,949

(22) Filed: Apr. 27, 2020

(65) Prior Publication Data
US 2021/0334133 A1 Oct. 28, 2021

(51) Int. Cl.
*G06F 9/46* (2006.01)
*G06F 9/48* (2006.01)

(52) U.S. Cl.
CPC .................. *G06F 9/4881* (2013.01)

(58) Field of Classification Search
None
See application file for complete search history.

(56) References Cited

U.S. PATENT DOCUMENTS

| | | | |
|---|---|---|---|
| 5,717,900 A * | 2/1998 | Whittaker | G06F 12/0808 711/151 |
| 6,832,280 B2 | 12/2004 | Malik et al. | |
| 8,205,205 B2 | 6/2012 | Franke | |
| 8,245,238 B2 * | 8/2012 | Neubauer | G06F 9/505 718/105 |
| 8,370,842 B2 * | 2/2013 | Bellows | G06F 9/4881 718/103 |

(Continued)

FOREIGN PATENT DOCUMENTS

WO 2006129767 12/2006

OTHER PUBLICATIONS

Machine Translation for WO2006129767A1, published Dec. 7, 2006, Total 27 pages.

(Continued)

*Primary Examiner* — Van H Nguyen
(74) *Attorney, Agent, or Firm* — Konrad, Raynes, Davda and Victor LLP; Janaki K. Davda

(57) ABSTRACT

Provided are techniques for adjusting a dispatch ratio for dispatching tasks from multiple queues. The dispatch ratio is set for each queue of a plurality of queues. A number of Central Processing Unit (CPU) cycles used by tasks from each of the plurality of queues during the interval is tracked. A CPU high percentage is determined that indicates a percentage of CPU cycles used by high priority tasks. In response to determining that the CPU high percentage is below a high threshold, a new dispatch ratio is calculated that indicates an increased number of high priority tasks are to be dispatched, and the new dispatch ratio is based on the CPU high percentage, the high threshold, and a current dispatches high value. The increased number of high priority tasks are dispatched from the high priority queue based on the new dispatch ratio during a new interval.

18 Claims, 9 Drawing Sheets

(56) References Cited

U.S. PATENT DOCUMENTS

| | | | | |
|---|---|---|---|---|
| 8,572,622 B2* | 10/2013 | Alexander | ............ | G06F 9/5027 |
| | | | | 718/104 |
| 9,665,493 B2* | 5/2017 | Ash | .................... | G06F 12/0875 |
| 9,836,334 B2* | 12/2017 | Divirgilio | ............. | G06F 9/3851 |
| 9,864,639 B2* | 1/2018 | Busaba | ................ | G06F 9/5016 |
| 9,898,341 B2* | 2/2018 | Chang | .................. | G06F 9/5038 |
| 10,558,596 B2* | 2/2020 | Nielsen | .................. | G06N 3/084 |
| 2019/0303309 A1 | 10/2019 | Sahoo et al. | | |

OTHER PUBLICATIONS

IBM, "A Fair and Adaptive Method of Servicing Priority Queues," dated May 12, 2009, IBM, IP.com, IPCOM000183034D, Total 3 pages.

\* cited by examiner

ADJUSTING A DISPATCH RATIO FOR MULTIPLE QUEUES

BACKGROUND

1. Field of the Invention

The present invention relates to a computer program product, computer system, and computer-implemented method for adjusting a dispatch ratio for dispatching tasks from multiple queues. For example, this may be done to limit Central Processing Unit (CPU) usage by lower priority tasks.

2. Description of the Related Art

A storage controller manages physical disk drives (and/or other storage, such as flash drives) and presents them to a host computer as logical units. The storage controller has priority queues for tasks in a device adapter, a cache, an operating system, etc. Each of these priority queues has a dispatch ratio. For example, the dispatch ratio may indicate: dispatch 30 tasks from high priority queues, then dispatch 10 tasks from medium priority queues, and next dispatch 3 tasks from lower priority queues.

SUMMARY

In accordance with certain embodiments, a computer program product is provided for adjusting a dispatch ratio for dispatching tasks from multiple queues. The computer program product comprises a computer readable storage medium having program code embodied therewith, the program code executable by at least one processor to perform operations. A dispatch ratio is set for each queue of a plurality of queues, where each of the plurality of queues has an associated priority. A number of Central Processing Unit (CPU) cycles used by tasks from each of the plurality of queues during an interval is tracked. A CPU high percentage is determined that indicates a percentage of CPU cycles used by high priority tasks in a high priority queue of the plurality of queues during the interval. In response to determining that the CPU high percentage is below a high threshold, a new dispatch ratio is calculated that indicates an increased number of high priority tasks are to be dispatched from the high priority queue, and where the new dispatch ratio is based on the CPU high percentage, the high threshold, and a current dispatches high value. The increased number of high priority tasks are dispatched from the high priority queue based on the new dispatch ratio during a new interval.

In accordance with other embodiments, a computer system is provided for adjusting a dispatch ratio for dispatching tasks from multiple queues. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A dispatch ratio is set for each queue of a plurality of queues, where each of the plurality of queues has an associated priority. A number of Central Processing Unit (CPU) cycles used by tasks from each of the plurality of queues during an interval is tracked. A CPU high percentage is determined that indicates a percentage of CPU cycles used by high priority tasks in a high priority queue of the plurality of queues during the interval. In response to determining that the CPU high percentage is below a high threshold, a new dispatch ratio is calculated that indicates an increased number of high priority tasks are to be dispatched from the high priority queue, and where the new dispatch ratio is based on the CPU high percentage, the high threshold, and a current dispatches high value. The increased number of high priority tasks are dispatched from the high priority queue based on the new dispatch ratio during a new interval.

In accordance with yet other embodiments, a computer-implemented method is provided for adjusting a dispatch ratio for dispatching tasks from multiple queues. The computer-implemented method comprises operations. A dispatch ratio is set for each queue of a plurality of queues, where each of the plurality of queues has an associated priority. A number of Central Processing Unit (CPU) cycles used by tasks from each of the plurality of queues during an interval is tracked. A CPU high percentage is determined that indicates a percentage of CPU cycles used by high priority tasks in a high priority queue of the plurality of queues during the interval. In response to determining that the CPU high percentage is below a high threshold, a new dispatch ratio is calculated that indicates an increased number of high priority tasks are to be dispatched from the high priority queue, and where the new dispatch ratio is based on the CPU high percentage, the high threshold, and a current dispatches high value. The increased number of high priority tasks are dispatched from the high priority queue based on the new dispatch ratio during a new interval.

BRIEF DESCRIPTION OF THE SEVERAL VIEWS OF THE DRAWINGS

In the drawings, like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Unlike conventional systems, in which the static dispatch ratio may lead to performance problems where lower priority tasks take longer than higher priority tasks, embodiments adjust the dispatch ratio based on CPU cycles taken by lower priority tasks to prevent performance issues from occurring. In this manner, embodiments avoid having lower priority tasks take many of the CPU cycles, leaving few CPU cycles for higher priority tasks, and, as a result, avoid a performance issue.

Figure 1:
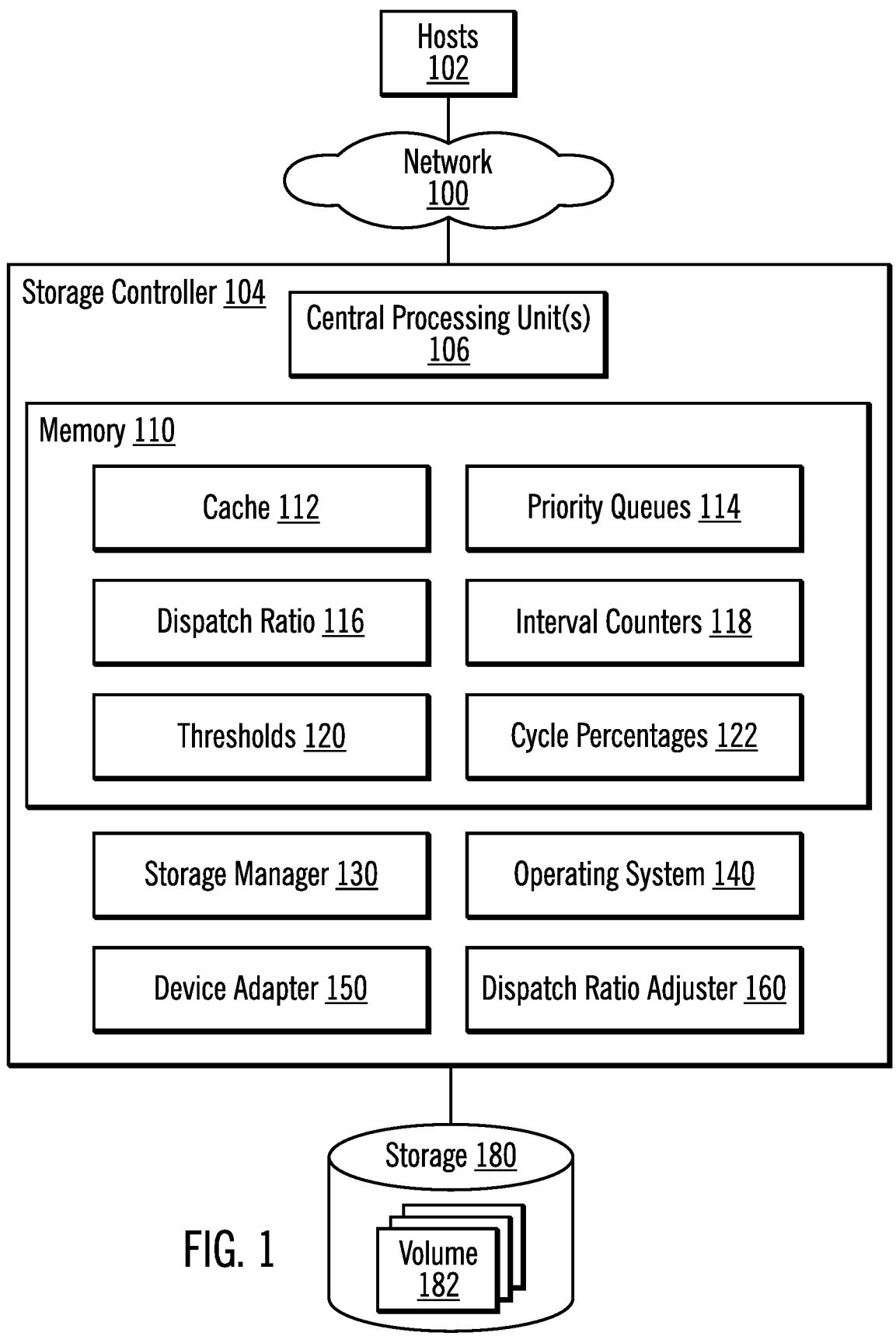
FIG. 1 illustrates, in a block diagram, a computing environment in accordance with certain embodiments.

FIG. 1 illustrates, in a block diagram, a computing environment in accordance with certain embodiments. A plurality of hosts 102 may submit Input/Output (I/O) requests to a storage controller 104 over a network 100 to access data at volumes 182 (e.g., Logical Unit Numbers, Logical Devices, Logical Subsystems, etc.) in a storage 180. The storage controller 104 includes one or more Central Processing Units (CPUs) 112 and a memory 110. The storage controller 104 also includes a storage manager 130, an operating system 140, a device adapter 150, and a dispatch ratio adjuster 160. The memory includes a cache 112, queues 114, dispatch ratio 116, interval counters 118, thresholds 120, and CPU percentages 122.

Thus, with embodiments, the storage controller 104 has priority queues 114 for tasks for a device adapter 150, a cache 112, an operating system 140, etc. The dispatch ratio adjuster 160 adjusts the dispatch ratio of the priority queues 114.

The storage manager 130 may move tracks between the cache 112 and the storage 180. The CPU 106, the cache 112, the queues 114, the storage manager 130, the operating system 140, and the device adapter 150 may communicate over one or more bus interfaces.

The storage 180 may comprise one or more storage devices known in the art, such as a solid state storage device (SSD), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The network 100 may comprise a Storage Area Network (SAN), a Local Area Network (LAN), a Wide Area Network (WAN), the Internet, and Intranet, etc. Alternatively, the hosts 102 may connect to the storage controller 104 over a bus interface, such as a Peripheral Component Interconnect (PCI) bus interface and other interfaces known in the art.

Figure 2:
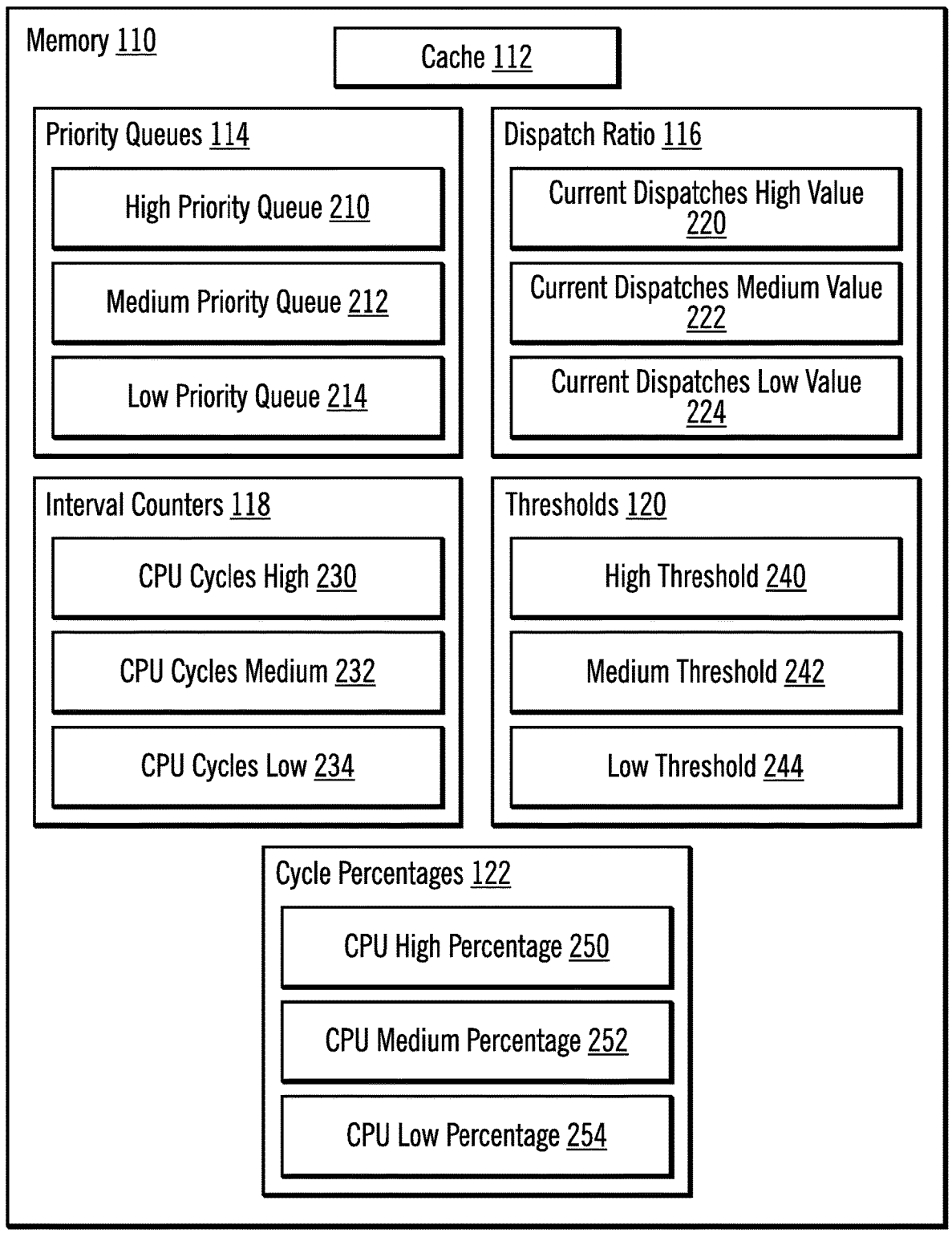
FIG. 2 illustrates, in a block diagram further details of a memory in accordance with certain embodiments.

FIG. 2 illustrates, in a block diagram further details of the memory 110 in accordance with certain embodiments. In FIG. 2, the priority queues 114 include a high priority queue 210 for storing high priority tasks, a medium priority queue 212 for storing medium priority tasks, and a low priority queue 214 for storing low priority tasks. Although three priority queues are shown for this embodiment, there may be any number of priority queues (e.g., priority queues A, B, C, D, E) in other embodiments.

In FIG. 2, the dispatch ratio 116 includes a current dispatches high value 220, a current dispatches medium value 222, and current dispatches low value 224. The dispatch ratio 116 includes a value for each of the priority queues 114. Thus, with embodiments having five priority queues 114, there would be five corresponding values in the dispatch ratio 116. The value of the dispatch ratio 116 for a priority queue 114 indicates how many tasks are dispatched from that priority queue 114 before moving to another priority queue 114.

In FIG. 2, the interval counters 118 include CPU cycles high 230, CPU cycles medium 232, and CPU cycles low 234. The number of interval counters 118 corresponds to the number of priority queues 114. Thus, with embodiments having five priority queues 114, there would be five corresponding interval counters 118. The interval counter 118 for a priority queue 114 indicates how many CPU cycles were used for tasks from that priority queue 114 during an interval (e.g., one minute). An interval may be described as a period of time.

In FIG. 2, the thresholds 120 include a high threshold 240, a medium threshold 242, and a low threshold 244. In certain embodiments, the high threshold 240 indicates a minimum amount (e.g., percentage) of CPU cycles that should be taken by the high priority tasks. For example, high priority tasks should take 70% of the CPU cycles used by the tasks of different priorities during the interval (e.g., one minute). In certain embodiments, the medium threshold 240 indicates a minimum amount (e.g., percentage) of CPU cycles that should be taken by the medium priority tasks. For example, medium priority tasks should take 20% of the CPU cycles used by the tasks of different priorities during the interval (e.g., one minute). In certain embodiments, the low threshold 240 indicates a maximum amount (e.g., percentage) of CPU cycles that should be taken by the low priority tasks. For example, low priority tasks should take no more than 10% of the CPU cycles used by the tasks of different priorities during the interval (e.g., one minute).

In FIG. 2, the CPU percentages 122 include a CPU high percentage 250, a CPU medium percentage 252, and a CPU low percentage 254.

Figure 3:
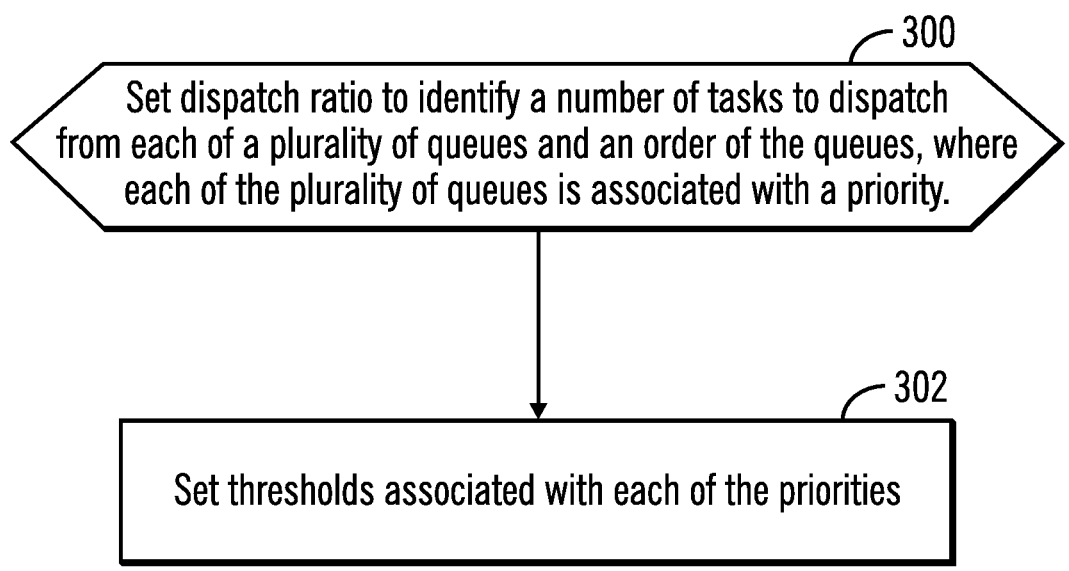
FIG. 3 illustrates, in a flowchart, operations performed to set certain values in accordance with certain embodiments.

FIG. 3 illustrates, in a flowchart, operations performed to set certain values in accordance with certain embodiments. Control begins at block 300 with the dispatch ratio adjuster 160 setting the dispatch ratio 116 to identify a number of tasks to dispatch from each of a plurality of queues and an order of the queues (e.g., during an interval (e.g., one minute)), where each of the plurality of queues is associated with a priority. In certain embodiments, the dispatch ratio adjuster 160 starts with a default dispatch ratio 116 for the high priority tasks, the medium priority tasks, and the low priority tasks (e.g., 30 high priority tasks are dispatched, then 10 medium priority tasks are dispatched, then 3 low priority tasks are dispatched). With embodiments, the default ("initial") dispatch ratio 116 may be provided by a system administrator or may be configured by the dispatch ratio adjuster 160 based on historical data or other factors.

In block 302, the dispatch ratio adjuster 160 sets thresholds 120 associated with each of the priorities. In certain embodiments, the dispatch ratio adjuster 160 starts with default ("initial") thresholds for the high threshold 240, the medium threshold 242, and the low threshold 244. With embodiments, the default ("initial") thresholds 120 may be provided by a system administrator or may be configured by the dispatch ratio adjuster 160 based on historical data or other factors.

The dispatch ratio adjuster 160 maintains the interval counters 118 on total CPU cycles used (i.e., "taken") by the high priority tasks, the medium priority tasks, and the low priority tasks. If the CPU cycles used by the high priority tasks are below the high threshold 240, the dispatch ratio adjuster 160 adjusts the dispatch ratio 116 between the priority queues 114.

Figure 4:
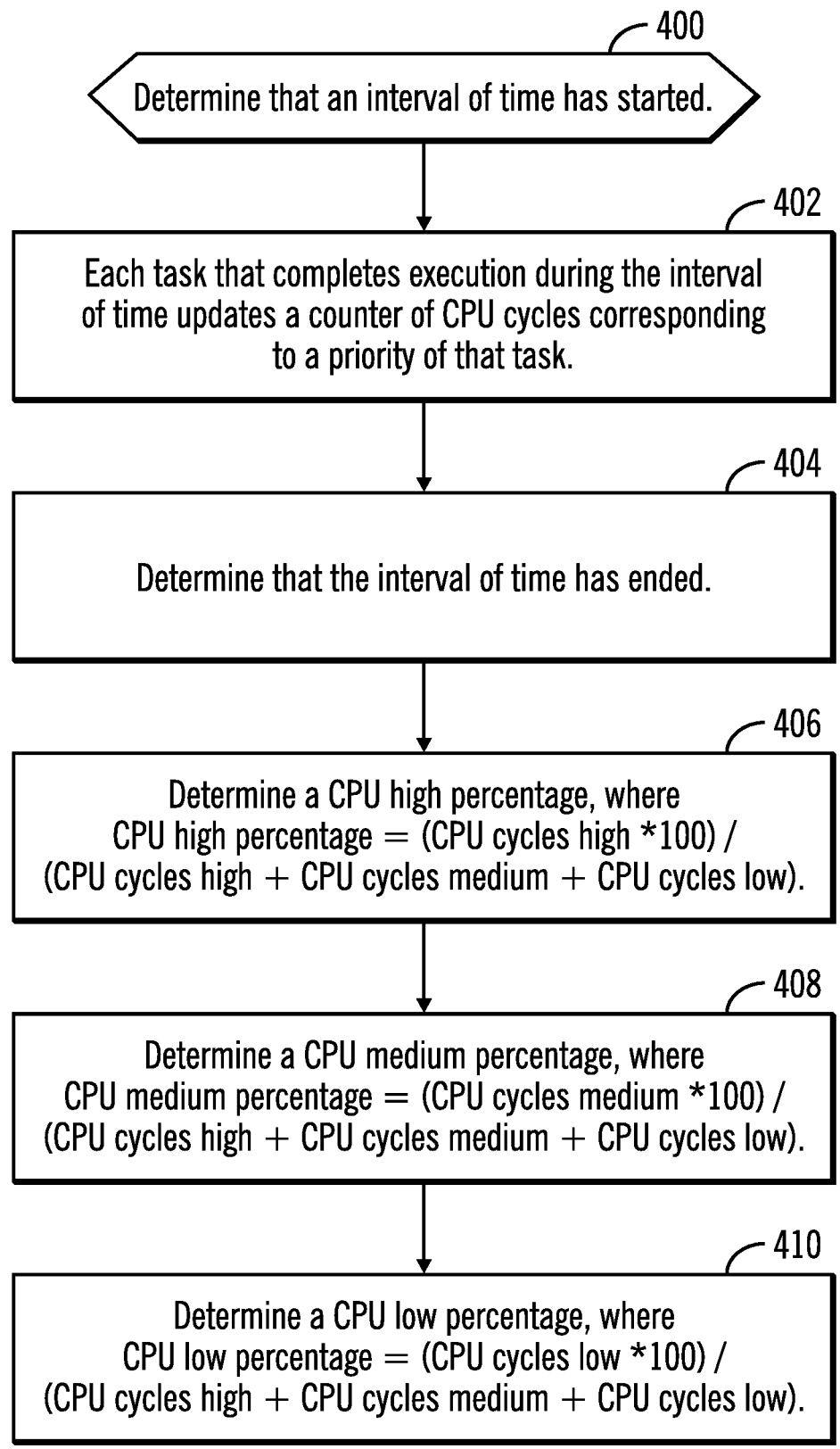
FIG. 4 illustrates, in a flowchart, operations performed by a dispatch ratio adjuster to determine CPU percentages in accordance with certain embodiments.

FIG. 4 illustrates, in a flowchart, operations performed by the dispatch ratio adjuster 160 to determine CPU percentages 122 in accordance with certain embodiments. Control begins at block 400 with the dispatch ratio adjuster 160 determines that an interval of time has started. This may include starting a timer to keep track of the interval of time.

In block 402, each task that completes execution in the interval of time updates a counter of CPU cycles corresponding to a priority of that task. For example, if two high priority tasks and one medium priority task complete in the interval, each of the two high priority tasks updates CPU cycles high 230, and the medium priority task updates the CPU cycles medium 232. In this example, the CPU cycles low 234 is not updated since a low priority task did not complete in this interval. In certain embodiments, the task may start before or during the interval and completes during the interval.

In block 404, the dispatch ratio adjuster 160 determines that the interval of time has ended. This may be based on the timer. In block 406, the dispatch ratio adjuster 160 determines the CPU high percentage using the following formula:

CPU high percentage=(CPU cycles high*100)/(CPU cycles high+CPU cycles medium+CPU cycles low)

In block 408, the dispatch ratio adjuster 160 determines the CPU medium percentage using the following formula:

CPU medium percentage=(CPU cycles medium*100)/(CPU cycles high+CPU cycles medium+CPU cycles low)

In block 410, the dispatch ratio adjuster 160 determines the CPU low percentage using the following formula:

CPU low percentage=(CPU cycles low*100)/(CPU cycles high+CPU cycles medium+CPU cycles low)

In certain embodiments, for each interval (e.g., 1 minute), the dispatch ratio adjuster 160 keeps track of the interval counters 118 of CPU cycles taken by tasks based on priority. These interval counters 118 are: the CPU cycles high 230, the CPU cycles medium 232, and the CPU cycles low 234. When a task finishes, the task increments the interval counter for its priority. At the end of the interval, the dispatch ratio adjuster 160 computes the percentage taken by each priority.

Figure 5A:
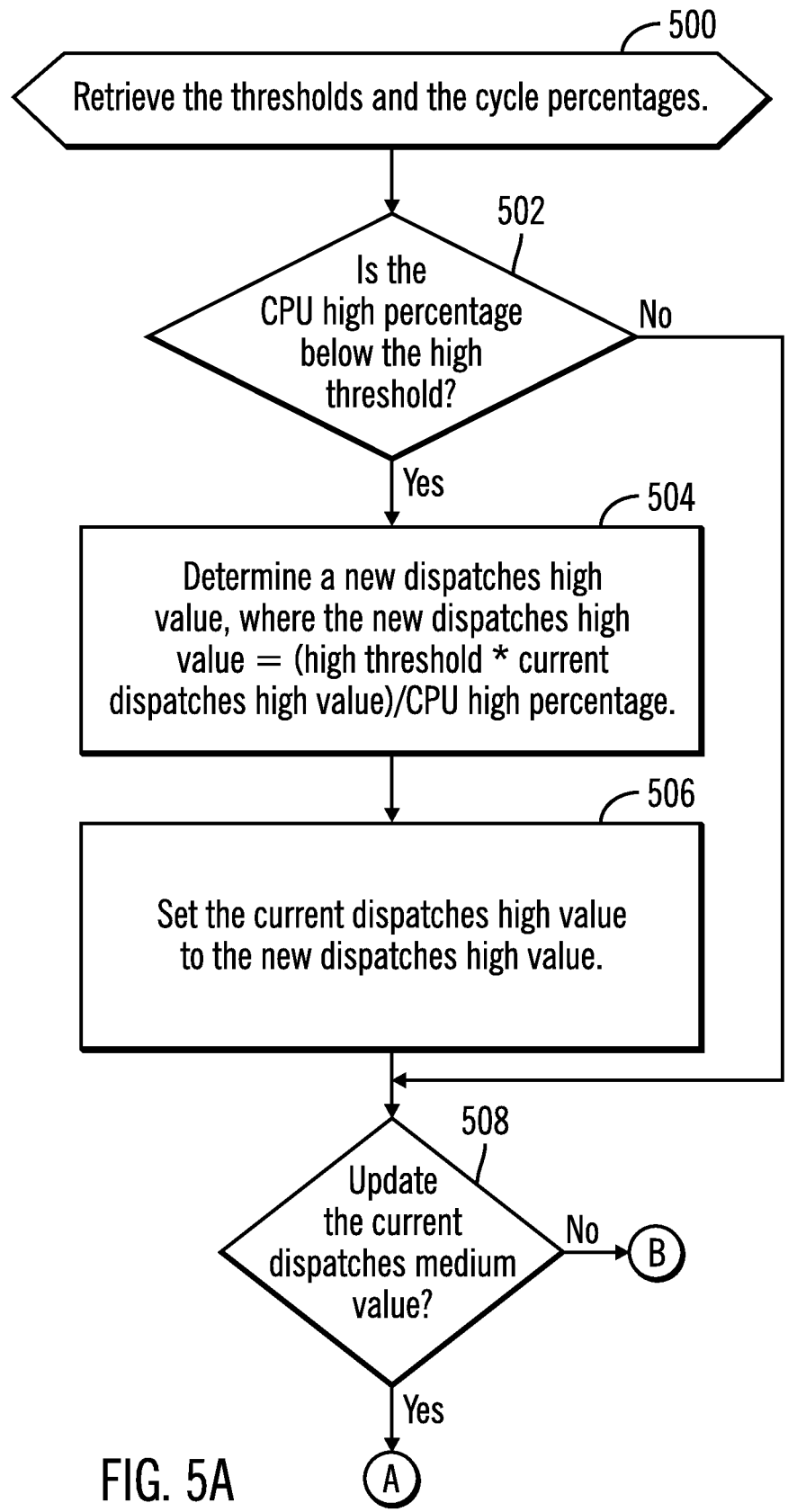
FIGS. 5A and 5B illustrate, in a flowchart, operations performed by the dispatch ratio adjuster to adjust a dispatch ratio and dispatch tasks in accordance with certain embodiments.
Figure 5B:
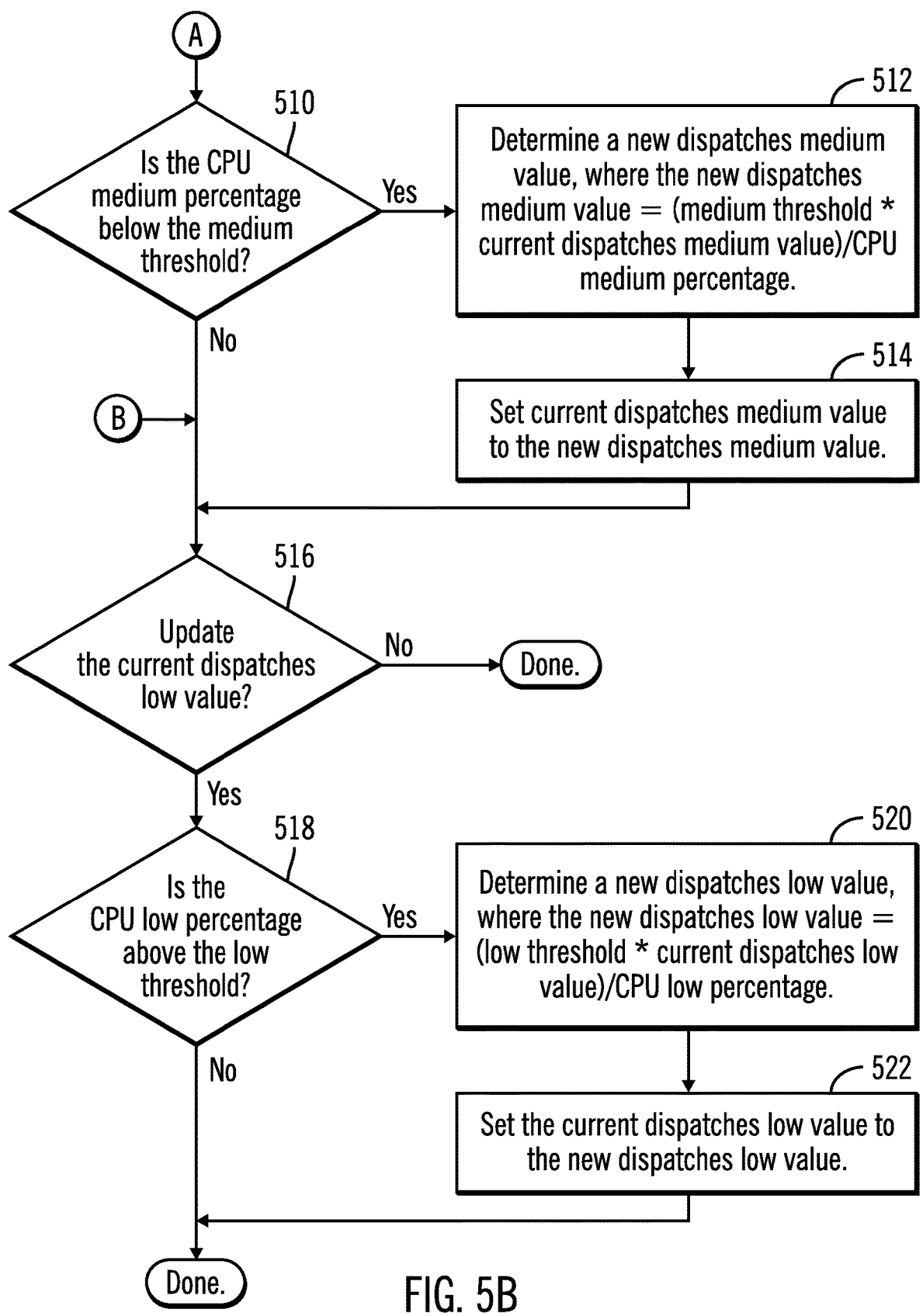

FIGS. 5A and 5B illustrate, in a flowchart, operations performed by the dispatch ratio adjuster 160 to adjust the dispatch ratio and dispatch tasks in accordance with certain embodiments. Control begins at block 500 with the dispatch ratio adjuster 160 retrieving the thresholds 120 (i.e., the high threshold 240, the medium threshold 242, and the low threshold 244) and the cycle percentages 122 (i.e., the CPU high percentage 250, the CPU medium percentage 252, and the CPU low percentage 254).

In block 502, the dispatch ratio adjuster 160 determines whether the CPU high percentage 250 is below the high threshold 240. If so, processing continues to block 504, otherwise, processing continues to block 508.

In block 504, the dispatch ratio adjuster 160 determines a new dispatches high value, using the following formula:

new dispatches high value=(high threshold*current dispatches high value)/CPU high percent In block 506, the dispatch ratio adjuster 160 sets the current dispatches high value 220 to the new dispatches high value.

In block 508, the dispatch ratio adjuster 160 determines whether to adjust the current dispatches medium value 222. If so, processing continues to block 510, otherwise, processing continues to block 516. In certain embodiments, this determination is made by checking an indicator (e.g., a flag or a bit) set by a system administrator. From block 508 (FIG. 5A), processing continues to block 510 (FIG. 5B).

In block 510, the dispatch ratio adjuster 160 determines whether the CPU medium percentage 252 is below the medium threshold 242. If so, processing continues to block 512, otherwise, processing continues to block 516.

In block 512, the dispatch ratio adjuster 160 determines a new dispatches medium value, using the following formula:

new dispatches medium value=(medium threshold*current dispatches medium value)/CPU medium percentage In block 514, the dispatch ratio adjuster 160 sets the current dispatches medium value 222 to the new dispatches medium value.

In block 516, the dispatch ratio adjuster 160 determines whether to update the current dispatches low value. If so, processing continues to block 518, otherwise, processing is done. In certain embodiments, this determination is made by checking an indicator (e.g., a flag or a bit) set by a system administrator.

In block 518, the dispatch ratio adjuster 160 determines whether the CPU low percentage 254 above the low threshold 244. If so, processing continues to block 520, otherwise, processing is done.

In block 520, the dispatch ratio adjuster 160 determines a new dispatches low value, using the following formula:

new dispatches low value=(low threshold*current dispatches low value)/CPU low percentage In block 522, the dispatch ratio adjuster 160 sets the current dispatches low value 224 to the new dispatches low value.

Figure 6:
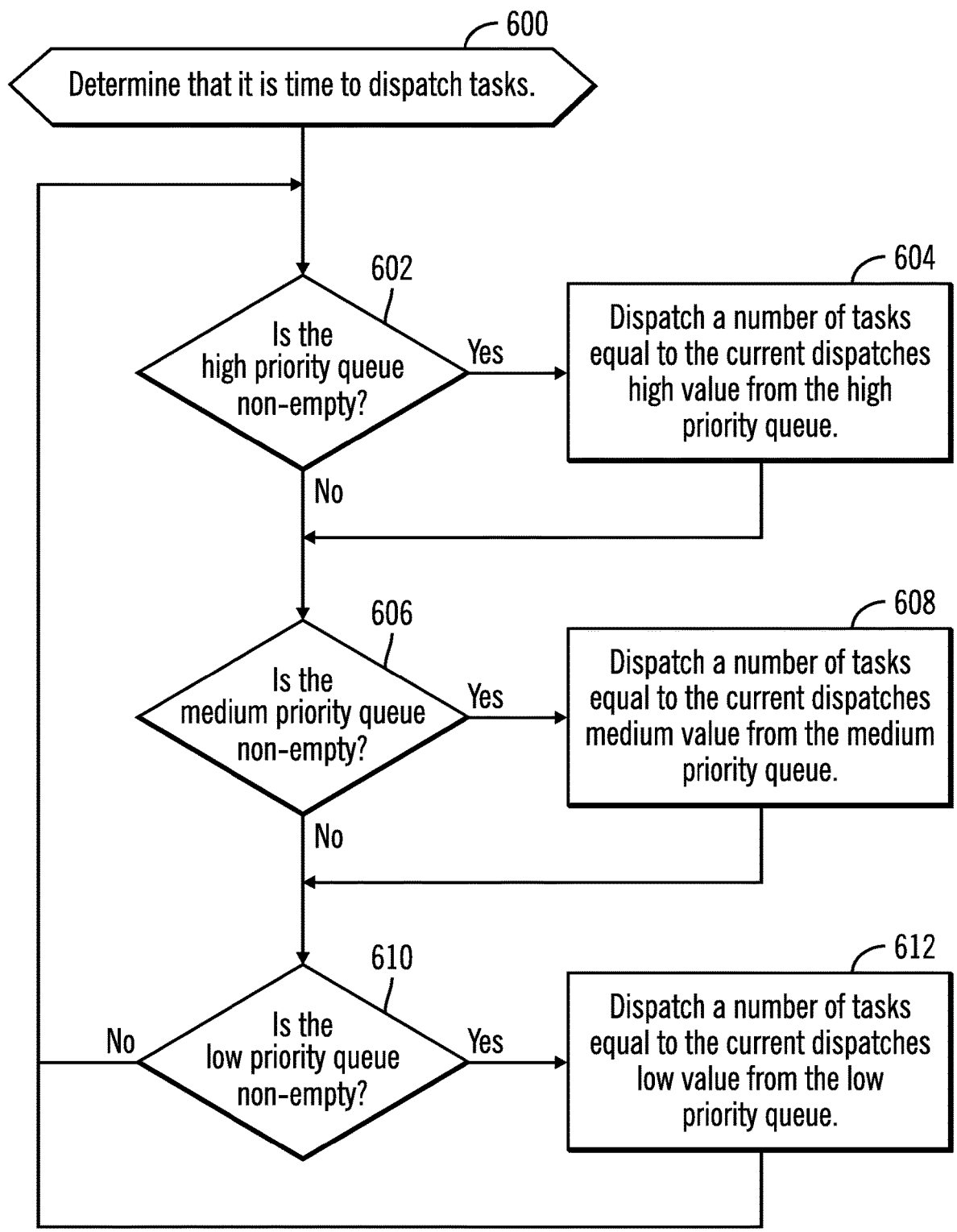
FIG. 6 illustrates, in a flowchart, operations performed by the dispatch ratio adjuster to dispatch tasks in accordance with certain embodiments.

FIG. 6 illustrates, in a flowchart, operations performed by the dispatch ratio adjuster 160 to dispatch tasks in accordance with certain embodiments. Control begins at block 600 with the dispatch ratio adjuster 160 determining that it is time to dispatch tasks.

In block 602, the dispatch ratio adjuster 160 determines whether the high priority queue 210 is non-empty. If so, processing continues to block 604, otherwise, processing continues to block 606. In block 604, the dispatch ratio adjuster 160 dispatches a number of tasks equal to the current dispatches high value 220 from the high priority queue 210. Then, processing continues to block 606.

In block 606, the dispatch ratio adjuster 160 determines whether the medium priority queue 212 is non-empty. If so, processing continues to block 608, otherwise, processing continues to block 610. In block 608, the dispatch ratio adjuster 160 dispatches a number of tasks equal to the current dispatches medium 222 value from the medium priority queue 212. Then, processing continues to block 610.

In block 618, the dispatch ratio adjuster 160 determines whether the low priority queue 214 is non-empty. If so, processing continues to block 612, otherwise, processing continues to block 602. In block 612, the dispatch ratio adjuster 160 dispatches a number of tasks equal to the current dispatches low value 224 from the low priority queue 214. Then, processing continues to block 602.

Thus, embodiments start with a default dispatch ratio for the current dispatches high value 220, the current dispatches medium value 222, and the current dispatches low value 224. If the CPU high percentage 250 is below the high threshold 240, then the current dispatches high value 220 is updated.

In various embodiments, any combination of the current dispatches high, 220, the current dispatches medium value 222, and the current dispatches low value 224 may be updated.

With embodiments, when low and/or medium priority tasks do not take a lot of CPU cycles, then they run at the default ("initial") dispatch ratio. However, when there are many low and/or medium priority tasks that are long running, with embodiments, they are dispatched less frequently so that high priority tasks get a certain threshold of CPU cycles.

The dispatch ratio indicates a number of tasks that are to be dispatched from each of the plurality of queues during an interval and an order of the plurality of queues. For example, the dispatch ratio indicates the number of high priority tasks that are to be dispatched from the high priority queue before moving to the medium priority queue, the number of medium priority tasks to be dispatched from the medium priority queue before moving to the low priority queue, and the number of low priority tasks to be dispatched from the low priority queue before moving back to the high priority queue.

Figure 7:
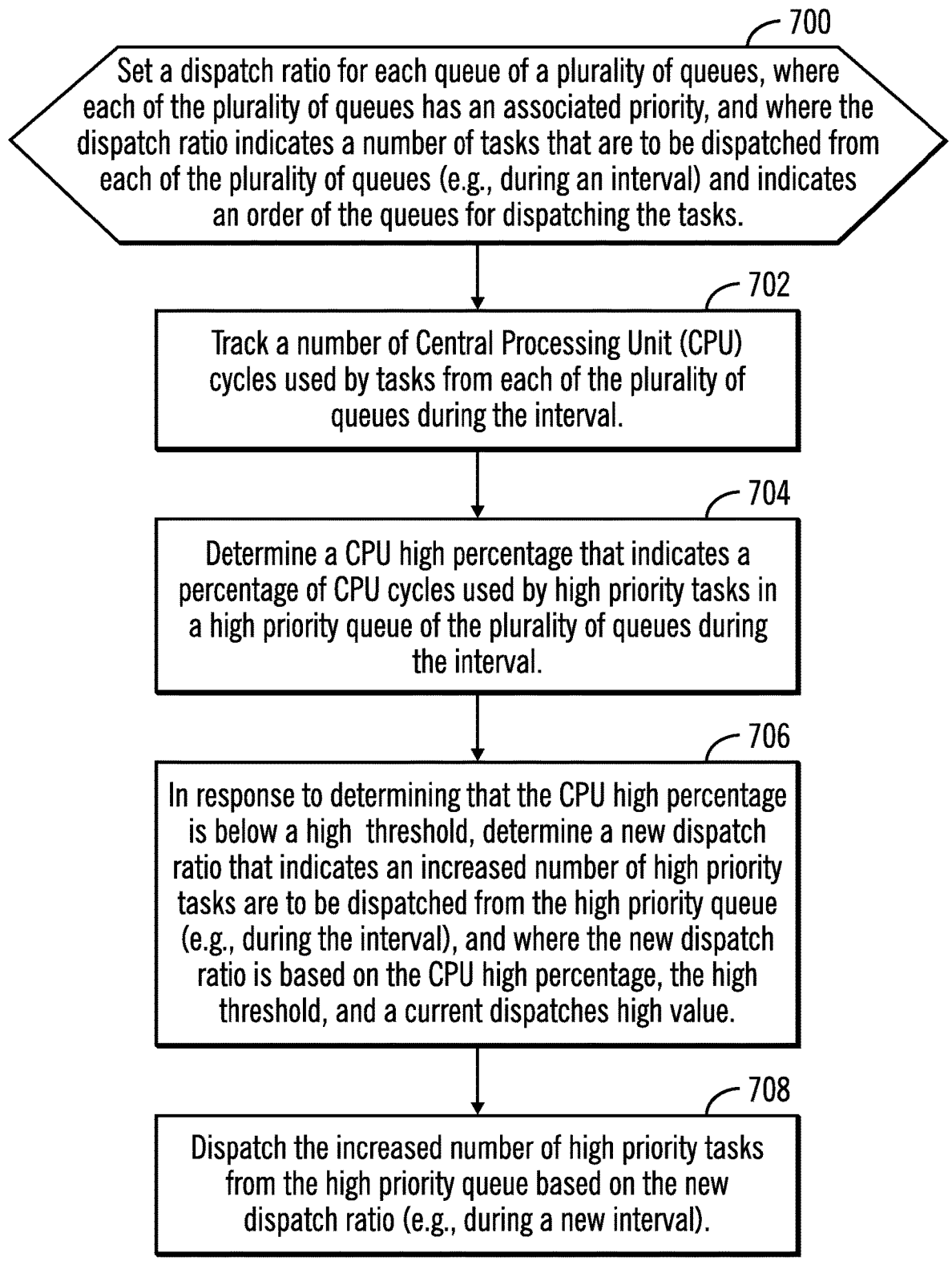
FIG. 7 illustrates, in a flowchart, operations performed by the dispatch ratio adjuster to dispatch tasks based on an updated dispatch ratio in accordance with certain embodiments.

FIG. 7 illustrates, in a flowchart, operations performed by the dispatch ratio adjuster to dispatch tasks based on an updated dispatch ratio in accordance with certain embodiments. Control begins at block 700 with the dispatch ratio adjuster 160 setting a dispatch ratio for each queue of a plurality of queues, where each of the plurality of queues has an associated priority, and where the dispatch ratio indicates a number of tasks that are to be dispatched from each of the plurality of queues (e.g., during an interval) and indicates an order of the queues for dispatching the tasks.

In block 702, the dispatch ratio adjuster 160 tracks a number of Central Processing Unit (CPU) cycles used by tasks from each of the plurality of queues during the interval. In block 704, the dispatch ratio adjuster 160 determines a CPU high percentage that indicates a percentage of CPU cycles used by high priority tasks in a high priority queue of the plurality of queues during the interval.

In block 706, in response to determining that the CPU high percentage is below a high threshold, the dispatch ratio adjuster 160 calculates a new dispatch ratio that indicates an increased number of high priority tasks are to be dispatched from the high priority queue (e.g., during the interval), and where the new dispatch ratio is based on the CPU high percentage, the high threshold, and a current dispatches high value. In block 708, the dispatch ratio adjuster 160 dispatches the increased number of high priority tasks from the high priority queue based on the new dispatch ratio (e.g., during a new interval). In various embodiments, the new interval may be the same period of time or a different period of time than the interval in which the number of Central Processing Unit (CPU) cycles used by tasks from each of the plurality of queues are tracked.

Embodiments adjust the dispatch ratio of tasks based on CPU utilization. An initial dispatch ratio for each different priority level (e.g., high, medium low) of tasks may be set. Interval counters on total CPU cycles taken by tasks based on priority may be collected. The dispatch ratio may then be adjusted based on the CPU cycles taken by different priority level tasks. In certain embodiments, if CPU cycles taken by high priority tasks fall below a predetermined threshold, then the dispatch ratio may be adjusted to increase the number of high priority tasks that are dispatched in the interval. In embodiments, if the CPU cycles taken by low priority tasks exceeds a predetermined threshold, then the dispatch ratio may be adjusted to decrease the number of low priority tasks that are dispatched in the interval.

Figure 8:
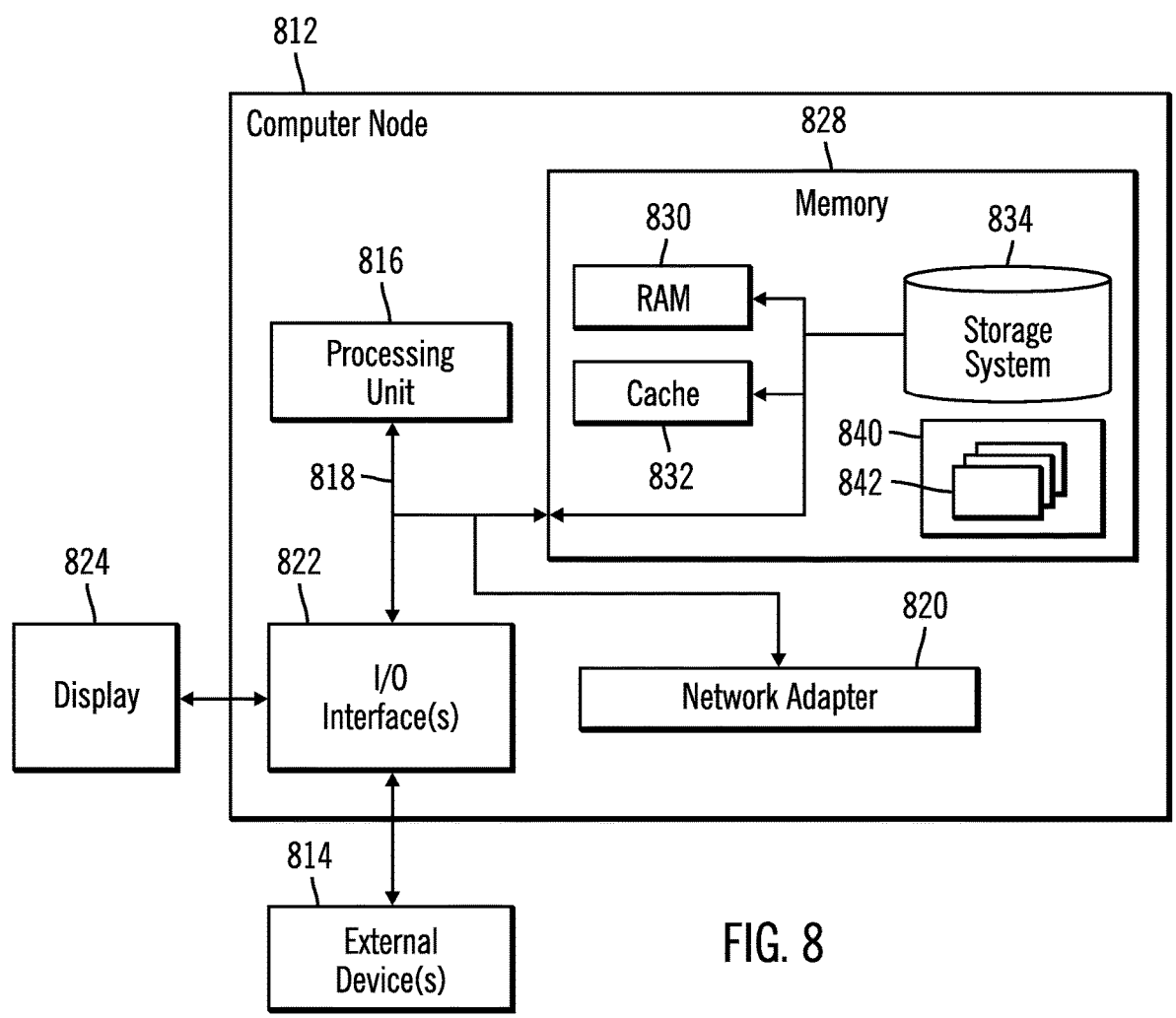
FIG. 8 illustrates, in a block diagram, a computer system in accordance with certain embodiments.

FIG. 8 illustrates, in a block diagram, a computer system in accordance with certain embodiments. In certain embodiments, the components of FIG. 1 may be implemented in such a computer system. Referring to FIG. 8, computer system 812 is only one example of a suitable computing system and is not intended to suggest any limitation as to the scope of use or functionality of embodiments of the invention described herein. Regardless, computer system 812 is capable of being implemented and/or performing any of the functionality set forth hereinabove.

The computational components of FIG. 1, including the hosts 102 and storage controller 104, may be implemented in one or more computer systems, such as the computer system 812 shown in FIG. 8.

The computer system 812 may be a computer system, which is operational with numerous other general purpose or special purpose computing system environments or configurations. Examples of well-known computing systems, environments, and/or configurations that may be suitable for use with computer system 812 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 812 may be described in the general context of computer system executable instructions, such as program modules, being executed by a computer system. Generally, program modules may include routines, programs, objects, components, logic, data structures, and so on that perform particular tasks or implement particular abstract data types. Computer system 812 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system 812 is shown in the form of a general-purpose computing device. The components of computer system 812 may include, but are not limited to, one or more processors or processing units 816, a system memory 828, and a bus 818 that couples various system components including system memory 828 to one or more processors or processing units 816.

Bus 818 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 812 typically includes a variety of computer system readable media. Such media may be any available media that is accessible by computer system 812, and it includes both volatile and non-volatile media, removable and non-removable media.

System memory 828 can include computer system readable media in the form of volatile memory, such as random access memory (RAM) 830 and/or cache memory 832.

Computer system 812 may further include other removable/non-removable, volatile/non-volatile computer system storage media. By way of example only, storage system 834 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 818 by one or more data media interfaces. As will be further depicted and described below, system memory 828 may include at least one program product having a set (e.g., at least one) of program modules that are configured to carry out the functions of embodiments of the invention.

Program/utility 840, having a set (at least one) of program modules 842, may be stored in system memory 828 by way of example, and not limitation, as well as an operating system, one or more application programs, other program modules, and program data. Each of the operating system, one or more application programs, other program modules, and program data or some combination thereof, may include an implementation of a networking environment. Program modules 842 generally carry out the functions and/or methodologies of embodiments of the invention as described herein.

Computer system 812 may also communicate with one or more external devices 814 such as a keyboard, a pointing device, a display 824, etc.; one or more devices that enable a user to interact with computer system 812; and/or any devices (e.g., network card, modem, etc.) that enable computer system 812 to communicate with one or more other computing devices. Such communication can occur via Input/Output (I/O) interfaces 822. Still yet, computer system 812 can communicate with one or more networks such as a local area network (LAN), a general wide area network (WAN), and/or a public network (e.g., the Internet) via network adapter 820. As depicted, network adapter 820 communicates with the other components of computer system 812 via bus 818. It should be understood that although not shown, other hardware and/or software components could be used in conjunction with computer system 812.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product, the computer program product comprising a computer readable storage medium having program code embodied therewith, the program code executable by at least one processor to perform operations for:
    setting a dispatch ratio for each queue of a plurality of queues, wherein each of the plurality of queues has an associated priority;
    tracking a number of Central Processing Unit (CPU) cycles used by tasks from each of the plurality of queues during an interval;
    determining a CPU high percentage that indicates a percentage of CPU cycles used by high priority tasks in a high priority queue of the plurality of queues during the interval;
    in response to determining that the CPU high percentage is below a high threshold, calculating a new dispatch ratio that indicates an increased number of the high priority tasks are to be dispatched from the high priority queue, and wherein the new dispatch ratio is based on the CPU high percentage, the high threshold, and a current dispatches high value; and
    dispatching the increased number of the high priority tasks from the high priority queue based on the new dispatch ratio during a new interval.

2. The computer program product of claim 1, wherein the plurality of queues comprise the high priority queue storing the high priority tasks, a medium priority queue storing medium priority tasks, and a low priority queue storing low priority tasks.

3. The computer program product of claim 1, wherein the dispatch ratio indicates a number of tasks that are to be dispatched from each of the plurality of queues during the interval and an order of the plurality of queues.

4. The computer program product of claim 1, wherein the program code is executable by the at least one processor to further perform operations for:
    in response to determining that a current dispatches medium value is to be adjusted,
        determining a CPU medium percentage that indicates a percentage of CPU cycles used by medium priority tasks in a medium priority queue of the plurality of queues during the interval;

in response to determining that the CPU medium percentage is below a medium threshold, calculating another new dispatch ratio that indicates an increased number of medium priority tasks are to be dispatched from the medium priority queue, and wherein the another new dispatch ratio is based on the CPU medium percentage, the medium threshold, and a current dispatches medium value; and dispatching the increased number of medium priority tasks from the medium priority queue based on the new dispatch ratio during the new interval.

5. The computer program product of claim 1, wherein the program code is executable by the at least one processor to further perform operations for:

in response to determining that a current dispatches low value is to be adjusted, determining a CPU low percentage that indicates a percentage of CPU cycles used by low priority tasks in a low priority queue of the plurality of queues during the interval;

in response to determining that the CPU low percentage is below a low threshold, calculating another new dispatch ratio that indicates an increased number of low priority tasks are to be dispatched from the low priority queue, and wherein the another new dispatch ratio is based on the CPU low percentage, the low threshold, and a current dispatches low value; and dispatching the increased number of low priority tasks from the low priority queue based on the new dispatch ratio during the new interval.

6. The computer program product of claim 1, wherein the program code is executable by the at least one processor to further perform operations for:

setting the high threshold, a medium threshold, and a low threshold.

7. A computer system, comprising:

one or more processors, one or more computer-readable memories and one or more computer-readable, tangible storage devices; and program instructions, stored on at least one of the one or more computer-readable, tangible storage devices for execution by at least one of the one or more processors via at least one of the one or more computer-redable memories, to perform operations, the operations comprising:

setting a dispatch ratio for each queue of a plurality of queues, wherein each of the plurality of queues has an associated priority;

tracking a number of Central Processing Unit (CPU) cycles used by tasks from each of the plurality of queues during an interval;

determining a CPU high percentage that indicates a percentage of CPU cycles used by high priority tasks in a high priority queue of the plurality of queues during the interval;

in response to determining that the CPU high percentage is below a high threshold, calculating a new dispatch ratio that indicates an increased number of the high priority tasks are to be dispatched from the high priority queue, and wherein the new dispatch ratio is based on the CPU high percentage, the high threshold, and a current dispatches high value; and dispatching the increased number of the high priority tasks from the high priority queue based on the new dispatch ratio during a new interval.

8. The computer system of claim 7, wherein the plurality of queues comprise the high priority queue storing the high priority tasks, a medium priority queue storing medium priority tasks, and a low priority queue storing low priority tasks.

9. The computer system of claim 7, wherein the dispatch ratio indicates a number of tasks that are to be dispatched from each of the plurality of queues during the interval and an order of the plurality of queues.

10. The computer system of claim 7, wherein the program instructions are stored on the at least one of the one or more computer-readable, tangible storage devices for execution by the at least one of the one or more processors via at least one of the one or more computer-readable memories, to perform operations, the operations further comprising:

in response to determining that a current dispatches medium value is to be adjusted, determining a CPU medium percentage that indicates a percentage of CPU cycles used by medium priority tasks in a medium priority queue of the plurality of queues during the interval;

in response to determining that the CPU medium percentage is below a medium threshold, calculating another new dispatch ratio that indicates an increased number of medium priority tasks are to be dispatched from the medium priority queue, and wherein the another new dispatch ratio is based on the CPU medium percentage, the medium threshold, and a current dispatches medium value; and dispatching the increased number of medium priority tasks from the medium priority queue based on the new dispatch ratio during the new interval.

11. The computer system of claim 7, wherein the program instructions are stored on the at least one of the one or more computer-readable, tangible storage devices for execution by the at least one of the one or more processors via at least one of the one or more computer-readable memories, to perform operations, the operations further comprising:

in response to determining that a current dispatches low value is to be adjusted, determining a CPU low percentage that indicates a percentage of CPU cycles used by low priority tasks in a low priority queue of the plurality of queues during the interval;

in response to determining that the CPU low percentage is below a low threshold, calculating another new dispatch ratio that indicates an increased number of low priority tasks are to be dispatched from the low priority queue, and wherein the another new dispatch ratio is based on the CPU low percentage, the low threshold, and a current dispatches low value; and dispatching the increased number of low priority tasks from the low priority queue based on the new dispatch ratio during the new interval.

12. The computer system of claim 7, wherein the program instructions are stored on the at least one of the one or more computer-readable, tangible storage devices for execution by the at least one of the one or more processors via at least one of the one or more computer-readable memories, to perform operations, the operations further comprising:

setting the high threshold, a medium threshold, and a low threshold.

13. A computer-implemented method, comprising:

setting a dispatch ratio for each queue of a plurality of queues, wherein each of the plurality of queues has an associated priority;

tracking a number of Central Processing Unit (CPU) cycles used by tasks from each of the plurality of queues during an interval;

determining a CPU high percentage that indicates a percentage of CPU cycles used by high priority tasks in a high priority queue of the plurality of queues during the interval;

in response to determining that the CPU high percentage is below a high threshold, calculating a new dispatch ratio that indicates an increased number of the high priority tasks are to be dispatched from the high priority queue, and wherein the new dispatch ratio is based on the CPU high percentage, the high threshold, and a current dispatches high value; and dispatching the increased number of the high priority tasks from the high priority queue based on the new dispatch ratio during a new interval.

14. The computer-implemented method of claim 13, wherein the plurality of queues comprise the high priority queue storing the high priority tasks, a medium priority queue storing medium priority tasks, and a low priority queue storing low priority tasks.

15. The computer-implemented method of claim 13, wherein the dispatch ratio indicates a number of tasks that are to be dispatched from each of the plurality of queues during the interval and an order of the plurality of queues.

16. The computer-implemented method of claim 13, further comprising operations for:

in response to determining that a current dispatches medium value is to be adjusted, determining a CPU medium percentage that indicates a percentage of CPU cycles used by medium priority tasks in a medium priority queue of the plurality of queues during the interval;

in response to determining that the CPU medium percentage is below a medium threshold, calculating another new dispatch ratio that indicates an increased number of medium priority tasks are to be dispatched from the medium priority queue, and wherein the another new dispatch ratio is based on the CPU medium percentage, the medium threshold, and a current dispatches medium value; and dispatching the increased number of medium priority tasks from the medium priority queue based on the new dispatch ratio during the new interval.

17. The computer-implemented method of claim 13, further comprising operations for:

in response to determining that a current dispatches low value is to be adjusted, determining a CPU low percentage that indicates a percentage of CPU cycles used by low priority tasks in a low priority queue of the plurality of queues during the interval;

in response to determining that the CPU low percentage is below a low threshold, calculating another new dispatch ratio that indicates an increased number of low priority tasks are to be dispatched from the low priority queue, and wherein the another new dispatch ratio is based on the CPU low percentage, the low threshold, and a current dispatches low value; and dispatching the increased number of low priority tasks from the low priority queue based on the new dispatch ratio during the new interval.

18. The computer-implemented method of claim 13, further comprising operations for:

setting the high threshold, a medium threshold, and a low threshold.

* * * * *